Figure 1:
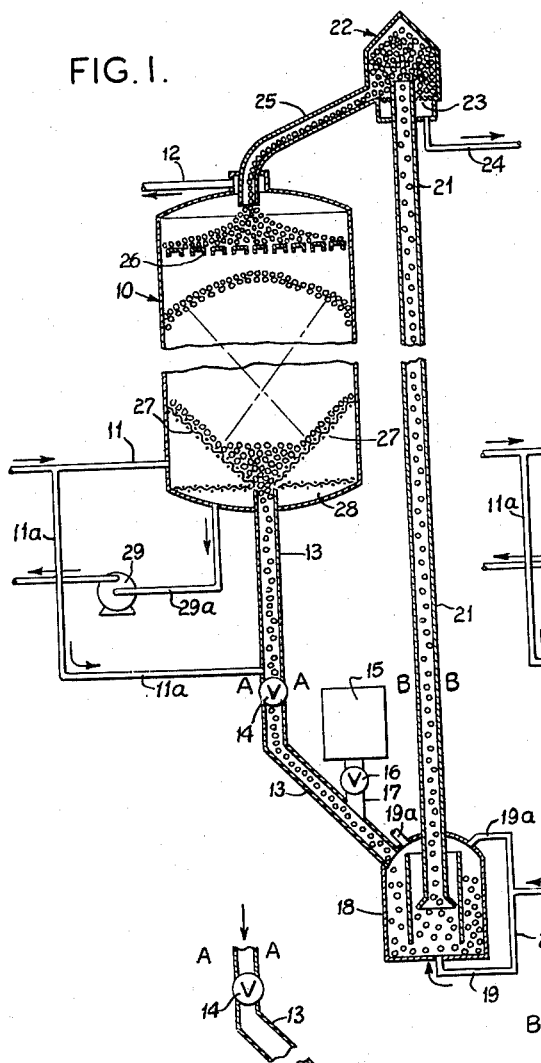

Sept. 6, 1960  W. M. COOPER  2,951,555
RECOVERY OF MALEIC ANHYDRIDE
Filed July 11, 1958  2 Sheets-Sheet 1

INVENTOR,
WILLIS M. COOPER

BY Fred R Ahlers
ATTORNEY

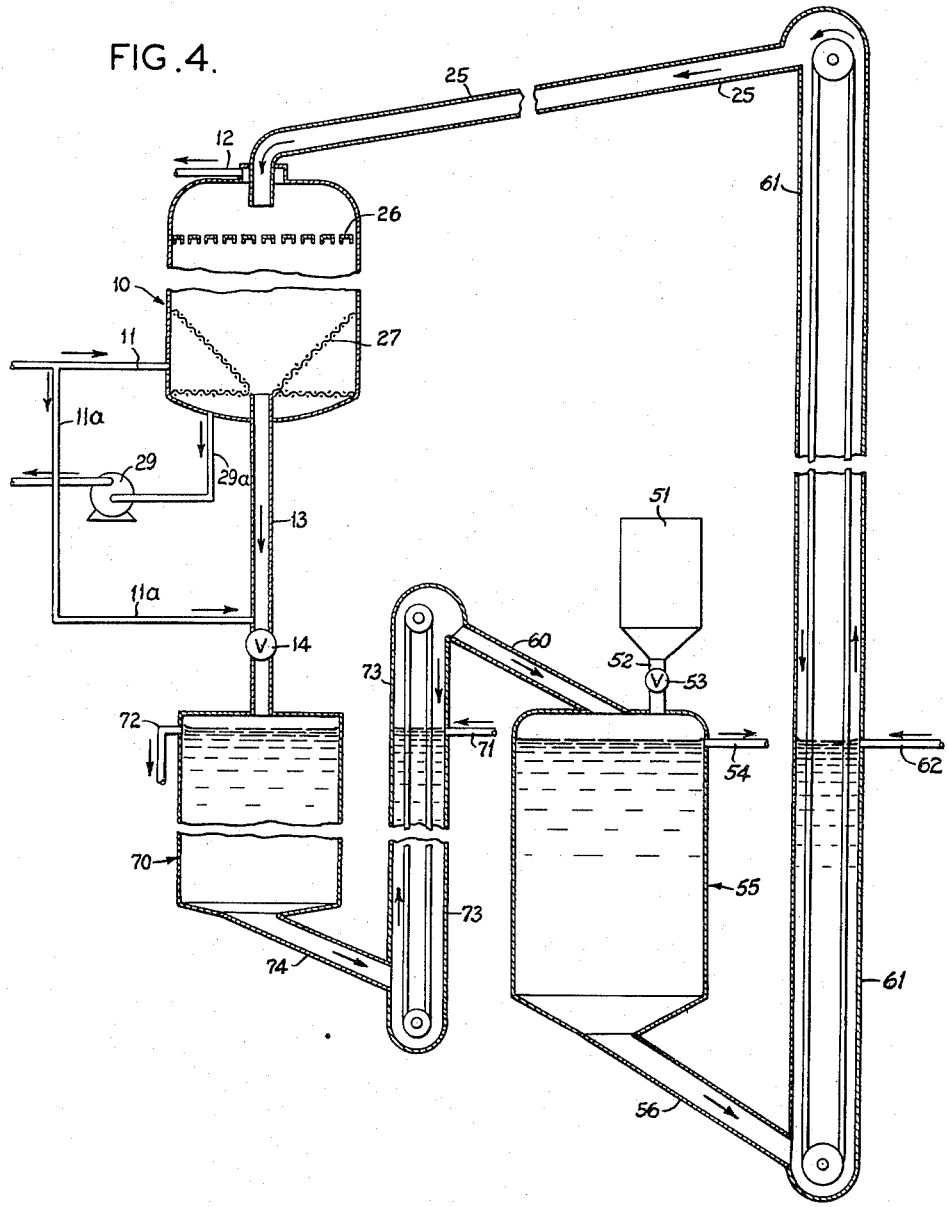

United States Patent Office

2,951,555
Patented Sept. 6, 1960

2,951,555

RECOVERY OF MALEIC ANHYDRIDE

Willis M. Cooper, Clayton, Mo., assignor to Monsanto Chemical Company, St. Louis, Mo., a corporation of Delaware Filed July 11, 1958, Ser. No. 748,578

10 Claims. (Cl. 183—119)

This invention relates to a process and apparatus for recovering maleic anhydride from the reaction mixture produced through a vapor-phase oxidation of hydrocarbons to produce maleic anhydride.

In general, processes for the manufacture of maleic anhydride by vapor-phase oxidation of maleic anhydride convertible hydrocarbons such as benzene, toluene, straight-chain hydrocarbons containing four or more carbon atoms such as for example n-butane, 1-butene, 2-butene, butadiene, heptane, isooctane and the like and such substituted materials as crotonaldehyde and crotonic acid regardless of the raw material being oxidized, employ a high ratio of air to maleic anhydride convertible raw materials in the vaporous mixture introduced into the reactors. The oxidation is accomplished by contacting the vaporous mixture containing the oxidizable material and an amount of air in excess of that containing a stoichiometric quantity of oxygen with a catalyst generally comprising vanadium oxide, molybdenum oxide or combinations of these oxides and various promoters and modifiers at a temperature of from about 300° C. to 600° C. or higher. More particularly, reaction temperatures of from about 350 to 550° C. may be employed with ratios of air to the oxidizable raw material of from 300 to 750 cu. ft. per lb. of oxidizable raw material. High air to oxidizable material ratios tend to avoid conditions of composition and temperature which would tend to produce explosions in the reactors. Obviously, the maleic anhydride in the gases coming from vapor-phase oxidation processes is in very low concentration, in the range of from 0.1 to 2.0 mole percent, and is quite difficult to recover economically in the liquid state, for cooling of the gases from the oxidization process results in substantially all of the maleic anhydride condensing as solid material.

One economical process for recovering maleic anhydride from converter gases lean in maleic anhydride involves scrubbing the gases coming from the converter with a solvent, such as water or an organic solvent, to form a dilute solution of maleic anhydride in the solvent or a dilute solution of maleic acid in the water. These dilute solutions may be recirculated through the scrubbing system thus forming a more concentrated solution which can be further processed economically. Where maleic anhydride is absorbed or dissolved in an organic solvent, a solvent recovery system must be provided. Maleic anhydride can be recovered from such solutions only with great difficulty and through the use of expensive refining procedures. When the maleic anhydride is recovered by scrubbing the converter gases with water, the maleic anhydride is obtained therefrom as maleic acid which must be converted by some dehydration process to maleic anhydride. In either case where a scrubbing solvent is employed, the maleic anhydride recovered from the solutions is very impure and must be subjected to purification and decolorizing processes. Heretofore, the economic recovery of even the dark colored maleic anhydride from such dilute gaseous mixtures in high yields has been most difficult.

It is an object of this invention to provide a method and apparatus for recovering maleic anhydride direct from gases containing low concentrations of maleic anhydride. It is also an object of this invention to provide a process for recovery of liquid maleic anhydride direct from gases lean in maleic anhydride vapors and especially from vapor-phase oxidation converter discharge gases. Still other objects of this invention will be apparent from the description thereof hereinafter appearing.

The objects of this invention are attained by a process and apparatus for recovering maleic anhydride from a gaseous mixture lean in maleic anhydride wherein the water dew point of the gaseous mixture is controlled within the range of from about 32° C. to about 50° C., said gaseous mixture is countercurrently contacted with a moving mass of non-reactive solid granular heat exchange material to cool these gases to a temperature within the range of from about 15 degrees above the water dew point to about the water dew point of the gaseous mixture, and withdrawing the cooled uncondensed gases maleic anhydride and the solid heat exchange material.

This recovery process involves contacting countercurrently the gaseous mixture lean in maleic anhydride which has a water dew point within the range of from about 32° C. to about 50° C., with a moving mass of sufficiently cool solid granular heat exchange material to cool said gaseous mixture to a temperature within the range of from about the water dew point to about 15 degrees, and preferably 10 degrees centigrade, above the water dew point of the gaseous mixture, maintaining the heat exchange zone under such temperature conditions that the granular solids passing through the zone reach a temperature above the crystallizing temperature of maleic anhydride (52.2° C.) and the cooled uncondensed gases reach a temperature within the above defined ranged, and withdrawing from the heat exchange zone the uncondensed gases, maleic anhydride and the solid granular heat exchange particles.

Preferably the process of this invention employs the effluent gaseous mixture from an oxidizing system. When such vapors are employed, they are countercurrently contacted with a downwardly moving mass of non-reactive granular material in a heat exchange zone thereby condensing maleic anhydride upon the heat exchange particles.

The water content of the gases can be adjusted to a value within the critical range, i.e., where the uncondensed gases will have a dew point within the range of from about 32° C. to about 50° C., by charging moist air to the converter. This may also be accomplished by adding moisture in the form of steam, to the gaseous effluent of the converter before it is fed to the pebble bed condenser. If the ambient air conditions are such that the gaseous effluent will have a dew point within the desired range, then of course, it will not be necessary to add water to the gases. When operating under the more preferred conditions, i.e., when the gaseous mixture has a dew point within the range of from 35° C. to 45° C., it will be necessary in most cases to adjust the water content of the gaseous mixture. It is to be understood that the above methods of adjusting the water content of the gaseous mixture are only illustrative and that other methods known to those skilled in the art may be employed.

In view of this increased moisture in the condenser inlet gas it would be reasonable to expect that the liquid condensing on the granular heat exchange particles would contain a sufficiently high concentration of water to convert maleic anhydride to maleic acid, and when the resulting liquid progressed into warmer and warmer zones, a substantial amount of maleic acid would be converted to a fumaric acid. However, this is not the case, for the gaseous mixture having a water dew point within the desired range can be contacted with granular heat exchange particles introduced at a particle inlet temperature as low as 24° C. without the formation of an appreciable quantity of fumaric acid in the recovered molten maleic anhydride.

The term "gaseous mixture lean in maleic anhydride" as employed herein in the specification and claims shall be understood to refer to those vaporous mixtures which are obtained when such raw materials as, for example, benzene, toluene, n-butane, 1-butene, 2-butene, butadiene, heptane, isooctane, crotonaldehyde and crotonic acid among others, are mixed with a high proportion of air (or an air-oxygen mixture) and introduced into an oxidation converter.

Figure 3:
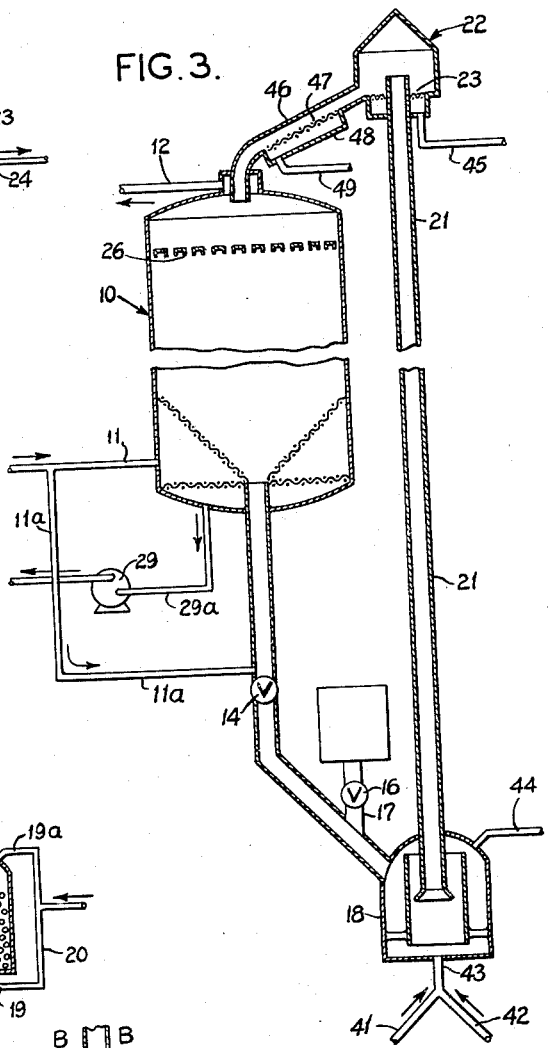
Figure 2:
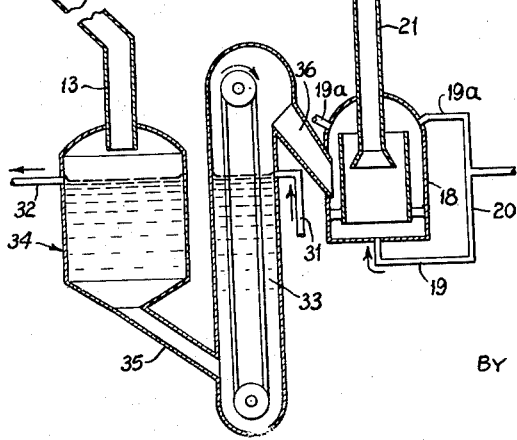

The process and apparatus of this invention will be more readily understood by describing them in reference to the accompanying drawings of which:

Fig. 1 is a diagrammatical illustration of the process of this invention in which molten maleic anhydride is recovered from a lower portion of the heat exchange zone in which the mass of granular heat exchange material is countercurrently contacted with a gaseous mixture from the vapor-phase oxidation converter;

Fig. 2 is a diagrammatical illustration of a modification of zone AA—BB of Fig. 1 wherein auxiliary cooling of the mass of granular heat exchange material is accomplished after heat exchange contact with the hot converter gases; and Fig. 3 is a diagrammatical illustration of the process of this invention employing a modification of a means for lifting and cooling the mass of granular heat exchange material after heat exchange contact with the hot converter gases.

Fig. 4 is a diagrammatical illustration of an embodiment of the process of this invention wherein after contact with hot converter gases adequate cooling of the granular heat exchange material requires relatively long contact with a cooling medium such as water and wherein lifting of the cooled granular heat exchange material is accomplished by a mechanical lift.

In all four figures identical reference numerals are employed to identify the same elements of the apparatus.

More specifically with reference to Fig. 1, a mass of granular heat exchange material such as for example ceramic pebbles, gravel and glass marbles among others, is moving downwardly through heat exchange chamber 10. The gaseous mixture lean in maleic anhydride obtained from a maleic anhydride converter wherein the vapor-phase oxidation of a maleic anhydride convertible material is accomplished and containing substantially no other organic dicarboxylic acid, is introduced into the heat exchange chamber 10 through line 11. The granular heat exchange material following the slope of screen 27 whose openings are sufficiently small to prevent the granular heat exchange material from passing therethrough, leave chamber 10 through line 13, the flow of the granular heat exchange material being controlled by star valve 14 or other suitable solid flow controlling means. The granular heat exchange material flows into the chamber 18 from which the granules are lifted thorugh line 21 into fountain separator 22 by a means such as the gas lift shown. Any gas may be employed for this gas lift. However, it is preferred to employ air at atmospheric temperature or below to effect this lift and thereby simultaneously effect some cooling of the granular heat exchange material. Air under a positive pressure from source such as a blower or from a tank of compressed air (source not shown) enters manifold 20 from which it flows into pickup chamber 18 through lines 19 and 19a with the point of its introduction into chamber 18 being adjusted to provide agitation of the granular heat exchange material in the chamber and to accomplish the lifting of the granules through line 21 to the separator. The precise operation and design of a gas lift of this type is understood by those skilled in the art, and hence, need not be described in detail. Alternately, the granular heat exchange material may be lifted from chamber 18 and delivered to line 25 by a mechanical elevator type lift such as a screw conveyor or a bucket lift as shown in Fig. 4. The velocity of the air rising through line 21 is decreased when reaching separator 22 of greater cross section and thus depositing the granular heat exchange material in the separator. The air passes thorugh grating 23 and is vented to line 24. The openings in grate 23 are of such a size as to permit fine particles produced by the attrition of the granular heat exchange material during the mechanical movement of said material to fall through and escape with the air vented through line 24 without permitting the granular heat exchange material to pass therethrough. The air vented through line 24 can be charged to the converters after removal of the fine particles of the heat exchange material and preheating, or be vented to the atmosphere after removal of the fine particles. The granular heat exchange material flows from separator 22 through line 25 into chamber 10. During the flow of the granular heat exchange material from chamber 18 to separator 22, the particles of the heat exchange material are generally sufficiently cooled by atmospheric air. However, under conditions of operation where atmospheric air is at a temperature greater than about 30° C., it is desirable to pre-cool the air before it enters chamber 18. Also, since the air and the particles are flowing in the same direction, it may be found desirable to introduce air pre-cooled into line 21 at spaced intervals between chamber 18 and separator 22 to complete the cooling of the pebbles by the time they reach the separator. It will be noted that in the drawing there is indicated only one point of introduction of air into the upper portion of chamber 18, however, in practice it will be understood that air will be introduced at points around the circumference of the upper portion of chamber 18 to insure adequate agitation of the particles of the heat exchange material. In chamber 10, a uniform distribution of the heat exchange material is provided by the use of such a device as grate 26. Throughout the cross section of chamber 10 a screen, sieve or punched plate having apertures of sufficient size to permit the particles of the heat exchange material to pass readily therethrough can be used in place of grate 26. Conical screen 27 attached to the inner wall surfaces of chamber 10 slopes downwardly and is attached to and is reduced to the same diameter of line 13 and provides a means for separating molten maleic anhydride from the particles of the granular heat exchange material and also provides a means for directing the granules to line 13. Conical screen 27 can be of woven wire, welded wire cloth or punched plate having a great plurality of apertures of such a size as to prevent the passage therethrough of individual particles of the granular heat exchange material. Conical screen 27 also provides a means for uniformly distributing the gaseous mixture from the reactor throughout the cross section of chamber 10. The hot gaseous mixture from the vapor-phase oxidation converter is introduced through line 11 at a temperature of from just above about the condensation point of maleic anhydride to about 350° C. or higher into the lower portions of the inner wall surfaces and the bottom of chamber 10. This lower portion of chamber 10 also provides a chamber 28 for collecting molten maleic anhydride which is removed therefrom through line 29a by pump 29 or any other suitable means. A portion of the gaseous mixture from the oxidation converter may be introduced into line 13 at a point above star valve 14 and the point of emergence of line 13 from chamber 10 as through line 11a to remove by vaporization any residual maleic anhydride carried through by the granular heat exchange material.

Tracing the conditions developed in the bed of granular heat exchange material in chamber 10 from startup will clearly demonstrate to those skilled in the art how molten maleic anhydride is recovered from the gaseous mixtures obtained from vapor-phase oxidation systems where said mixtures are lean in maleic anhydride, that is, they contain 2.0 mole percent or less of maleic anhydride without cementing of the particles of heat exchange material with solid maleic anhydride and without forming fumaric acid. Before the condensation system is put on stream, the granular heat exchange material is charged to the system for example through chamber 15, line 17 and slide valve 16 and/or through a charging port (not shown) in chamber 10. The gaseous lift system is set into operation and additional heat exchange material charged through chamber 15, line 17 and slide valve 16 until the distribution of the heat exchange material has reached an equilibrium, thereafter a temperature gradient is established in the bed of heat exchange material in chamber 10 substantially equal to the temperature gradient existing during operation, that is, the temperature of the lower portion of the bed in chamber 10 will be above the crystallization temperature of maleic anhydride, while the temperature of the gases discharged from chamber 10 and the temperature of the bed above grate 26 will be within the range of from about 32° C. to about 50° C. These temperature conditions in the bed of heat exchange material in chamber 10 can be obtained by introducing heated air into chamber 10 through line 11. When the temperature conditions approximating the above have been obtained, the gaseous mixture from the vapor-phase oxidation reactor with or without pre-cooling is introduced into chamber 10 through line 11. This hot gaseous mixture flows upwardly through the bed of heat exchange material thus producing countercurrent contact between the granular heat exchange material and the converter gases. Screen 27 distributes the converter gaseous mixture through the bed of heat exchange material and as the gaseous mixture rises through the bed, it is cooled and maleic anhydride condenses on the particles of the heat exchange material in chamber 10 below the upper portion of said bed lying just below grate 26 and solid maleic anhydride forms on the uppermost particles in this condensation zone. When the temperature of the lower portion of chamber 10 is above the condensation temperature of maleic anhydride and when the heat exchange material having maleic anhydride condensed thereon moves downwardly through chamber 10, these particles are brought into contact with vapors at increasingly higher temperatures first melting the solid maleic anhydride and, as they progress further downwardly, removing a substantial portion of the maleic anhydride from the particles, resulting in an upward flow of a vaporous mixture substantially enriched with respect to maleic anhydride. No substantial amount of maleic anhydride passes through the top portion of chamber 10 and through line 12 since it is being contacted with granular heat exchange material at a temperature substantially below the water dew point up to one corresponding to the water dew point of the gaseous mixture and preferably within the range of from about 10 to 15 degrees centigrade below the water dew point of said gaseous mixture. There is no gas flow out of the bottom of chamber 10 through line 13 because of the gas seal at star valve 14 resulting from the positive pressure exerted by air passing upward from chamber 18 through line 13. Thus with condensation taking place in the upper portion of the bed of heat exchange material below grate 26 in chamber 10, and evaporation taking place at and slightly above the initial point of contact between the gaseous mixture from the oxidation converter and the bed of heat exchange material, the gases moving upward through the bed are enriched in respect to maleic anhydride and a liquid phase of maleic anhydride appears just above the upper portions of screen 27. This liquid phase continues downward and passes through screen 27 depositing molten maleic anhydride in the bottom portion of chamber 10, hereinbefore defined, and being below the point of introduction of the hot reactor gases into chamber 10. After this liquid phase has been established and liquid maleic anhydride begins to collect, a portion of the rising gases is withdrawn from chamber 10 through line 12 at a point where the temperature of these gases is within the range of from 32° C. to about 50° C. or more. The gases withdrawn from chamber 10 through line 12 therefore contain little or none of the maleic anhydride charged to the heat exchange zone in chamber 10 from the reactor gases.

Chamber 15 is also a storage chamber for fresh heat exchange material which is to be introduced into the system to make up for the heat exchange material lost by attrition. Slide valve 16 in line 17 is operated as required to permit flow of fresh heat exchange material into line 13.

Fig. 2 of the accompanying drawings illustrates a means for cooling the heat exchange material with water subsequent to leaving the heat exchange zone in chamber 10, but prior to entering lift chamber 18. As hereinbefore pointed out, this means for auxiliary cooling of the heat exchange material lines within the zone AA—BB of Fig. 1. After heat exchange material has passed through star valve 14, it is discharged from line 13 into cooling chamber 34 passing downwardly and countercurrently through flowing water in chamber 34, thence through line 35 which discharges into elevator 33. Elevator 33 is shown as a bucket type elevator having draining buckets. These buckets pick up the granular heat exchange material and carry it upward through downwardly moving water in elevator 33 and discharge the wet heat exchange material into line 36, and the heat exchange material then flowing into lift chamber 18. Water for this auxiliary cooling is preferably introduced into elevator 33 and removed from chamber 34 at substantially the same level, as through lines 31 and 32, thus causing countercurrent contact with the granular heat exchange material shown in chamber 34 and elevator 33. In this modification the lifting of the heat exchange material from chamber 18 to separator 22 is accomplished in the same manner as hereinbefore described, the air lift achieving drying of the wet particles of the granular heat exchange material and also producing additional cooling of these particles by the evaporation of water therefrom.

With regard to the modification as illustrated by Fig. 3, the condensation system taking place in the heat exchange zone in chamber 10, the introduction of the reactor gases into chamber 10, the removal of uncondensed gas therefrom, the removal of molten maleic anhydride therefrom, and the removal of the granular heat exchange material therefrom is substantially the same as that described in connection with Fig. 1. However, in the modification illustrated by Fig. 3, the lifting of the granular heat exchange material from chamber 18 to separator 22 is accomplished by the combined action of air and water introduced under pressure into lift chamber 18. Compressed air from line 41 and water under pressure from line 42, are admixed and fed through 43 into chamber 18. Additional air and/or water is introduced into the upper portion of chamber 18 through line 44 to provide agitation of the heat exchange material. The mixture of the heat exchange material, air and water enters separator 22 where there is a decrease of velocity brought about by the introduction of the stream of materials into a chamber of greatly increased cross section causing the granular heat exchange material and water to drop onto grate 23. The air and some water passes out through line 45. The heat exchange material together with the remaining water flows through line 46 and over a screen, sieve, punched plate or grate such as screen 47 where the water drains from the particles of the heat exchange material, flows into chamber 48 and is withdrawn through line 49 while the heat exchange material passes beyond this separating means and into chamber 10. It is preferred that these heat exchange particles be dried before they enter chamber 10, as for example by introducing dry air or heated air into line 46 so that any moisture which does not drain off the particles through screen 47 is carried into chamber 22 and out line 49.

With regard to the modification as illustrated by Fig. 4, the condensation system taking place in the heat exchange zone in chamber 10, the introduction of the reactor gases into chamber 10, the removal of uncondensed gas therefrom, the removal of molten maleic anhydride therefrom, and the removal of the granular heat exchange material therefrom is substantially the same as that described in connection with Fig. 1. However, in the modification illustrated by Fig. 4, the granular heat exchange material from chamber 10 falls through line 13 through star valve 14 or other suitable solid flow control means into quenching chamber 70, similar to cooling chamber 34 of Fig. 2. The granular heat exchange particles pass countercurrently through flowing water through chamber 70, thence, through line 74 which discharges into elevator 73, as similar to elevator 33 in Fig. 2, and is similar to a bucket type elevator having draining buckets. These buckets pick up the granular heat exchange particles and carry them up through downwardly moving water in elevator 73 and discharges the wet heat exchange material into line 60 which discharges into chamber 55. Countercurrent flow of water in elevator 73 and the quenching chamber 70 can be accomplished in any manner. However, by introducing the cooling water into elevator 73 through line 71 and withdrawing it from quenching chamber 70 to line 72 at the same level as the point of introduction into elevator 73, a satisfactory countercurrent flow of water can be established.

The granular heat exchange material discharging into cooling chamber 55 comes into contact with a cooling liquid which will reduce the temperature of the heat exchange particles to that required by the condensation process taking place in chamber 10. Cooling chamber 55 should be of sufficient capacity to hold the granular heat exchange particles till their temperature has been reduced to the desired particle temperature. Attached to cooling chamber 55 by means of line 52 and valve 53 is chamber 51 which is provided for a charging of granular heat exchange particles to the condensation system. Granular heat exchange particles pass from cooling chamber 55 through line 56 through a second mechanical lift such as the bucket type elevator 61 having draining buckets. Elevator 61 discharges the cool granular heat exchange particles through line 25 into chamber 10. Again for more efficient cooling the cooling liquid which may be satisfactory refrigerated water and organic liquid or a mixture of water and water miscible organic liquid such as a mixture of water and methanol, water and ethanol and the like which can be cooled to a temperature below the freezing point of water if such temperatures are desired for cooling of granular heat exchange particles. Countercurrent flow of the cooling liquid in cooling chamber 55 can be accomplished in a manner similar to that employed in the modification as shown in Fig. 2 and in the qeunching portion of the modification shown in Fig. 4, that is, the cooling liquid is charged into elevator 61 and withdrawn from cooling chamber 55 at the same hydrostatic level as shown by charging into line 62 and withdrawing through line 54.

It desired, jets of air can be introduced into elevator 61 countercurrent to the improvement of the draining buckets to remove from the granular heat exchange particles any of the cooling liquid remaining on the particles. This means for drying the particles is not shown in Fig. 4 since it will be readily understood by those skilled in the art.

When either of the modifications as illustrated in Figs. 2, 3 and 4 are employed, the hot particles of the heat exchange material upon contact with water produce a quantity of steam which flows into line 13 and provides an efficient gas seal at star valve 14.

In carrying out the process of this invention, it is essential that the rate at which the granular heat exchange material is introduced into chamber 10 and the temperature of the heat exchange material entering chamber 10 through line 25 be coordinated with the rate at which the gases from the oxidation reactor are introduced into the base of the heat exchange chamber, the temperature of the gaseous mixture and the maleic anhydride content thereof. This process is exceptionally efficient when the rate of the addition of the granular heat exchange material and the rate of addition of the gaseous mixture are so adjusted that the gaseous mixture is cooled by the bed of granular heat exchange material to a temperature within the range of from about 10 to 15° C. above the dew point down to about the dew point of the gaseous mixture. It is even more preferred to cool the gaseous mixture to a temperature within the range of from 5° C. above the dew point to the dew point of the water vapor therein. This can be most readily accomplished by having the particles of the granular heat exchange material cooled to a temperature of from several degrees below to 15° C. or more below the water dew point, i.e., from about 48 to about 25° C. or lower, prior to their introduction into chamber 10.

The gaseous mixture from the vapor-phase oxidation converter can have a temperature in the range of from about 300° C. to 500° C. and normally is at a temperature of from about 400° C. to about 450° C. Prior to the introduction of this gaseous mixture into heat exchange chamber 10, the gaseous mivture may be cooled to a temperature below about 350° C. and preferably to a temperature within the range of about 130° C. to 190° C. The particles of the granular heat exchange material leaving chamber 10 will not have an appreciable amount of maleic anhydride on their surfaces and any maleic anhydride on the surfaces of these particles can be stripped off by the gaseous mixture entering line 13 between the bottom of chamber 10 and star valve 14. It may be desirable to cool the gases coming from the vapor-phase oxidation reactor as indicated above first, to prevent further oxidation from taking place during the transfer of the gaseous mixture from the reactor to the condensation system and during the early stages of contact with the granular heat exchange material, and second, to introduce gases at temperatures as high as 500 to 600° C. into the condensation system would require a greater mass of granular heat exchange material and a higher rate of circulation of this heat exchange material to accomplish the required cooling of the gases than would be required by the use of the gaseous mixture cooled to 300° C.

Even though crystalline maleic anhydride has been observed as forming in the upper portion of the bed of granular heat exchange material in chamber 10, and a liquid phase of maleic anhydride observed as appearing on the surfaces of the particles of the heat exchange material, there is sufficient free space in the bed of heat exchange material to permit substantially free flow of the gases therethrough providing an excellent contact between said gases and the granular heat exchange material. That there is little resistance to the flow of the gases through the vent of heat exchange material has been demonstrated by the fact that the pressure drop between the pressure of the gases entering chamber 10 and those leaving chamber 10 is less than 0.4" of Hg. With continued use of the granular heat exchange material in the process of this invention there tends to be an accumulation of high molecular weight reaction products on the particle surfaces. Although the accumulation develops slowly it may become sufficiently great as to cause agglomeration of the particles. This can be avoided by withdrawing from line 13, prior to its entrance into chamber 18, a side stream of particles of the granular heat exchange material and subjecting them to contact with air at high temperatures to burn off the accumulated materials. The particles of the heat exchange material so treated can then be returned to chamber 18 or be added to chamber 15 for reuse in the process of this invention.

The initial operation of the process of this invention can be established from the specific heat of the particular granular heat exchange material to be used, the maleic anhydride content of the gaseous reaction mixture introduced into chamber 10, the temperature of this gaseous reaction mixture and its specific heat and other calculable conditions. From this information the amount of the particular heat exchange material required for contact with a unit volume of the gases in heat exchange chamber 10 to accomplish the desired condensation can be estimated. The rate of movement of the granular heat exchange material through chamber 10 can be changed to correct deviations from the estimated rates of flow.

The granular heat exchange material with which chamber 10 is packed can be particles of any durable heat stable solid material; the heat capacity and heat conductivity of the particles should be high. Although porous particles of granular heat exchange material such as the silica-alumina cracking catalysts can be used, it is preferred to employ a substantially non-porous particle for the heat exchange material. Exceptionally useful granular heat exchange materials include, gravel, pebbles, glass marbles, quartz chips, Carborundum, Alundum, Mulite, kaolin, ceramic materials, metallic pellets or spheres composed of non-catalytic materials, that is, metals which will not promote oxidation of the materials in the gaseous mixtures from the converters at temperatures up to about 500° C., among other similar materials. The size of the particles of the granular heat exchange material can vary from about $\frac{1}{8}$" maximum diameter to about 4". Larger particles would more economically be lifted from chamber 18 to line 25 by a mechanical elevator such as a bucket elevator or a screw conveyor. In addition to having high heat capacity and good heat conductivity, the particles of the granular heat exchange material should be relatively stable to thermal shock and be sufficiently strong so that there is a minimum of disintegration by attrition.

The following examples are presented to illustrate the operation of the process of this invention and are not intended to be a limitation thereon.

EXAMPLE I

A transfer line for the effluent gases from a maleic anhydride converter where a mixture of benzene and air are contacted in vapor-phase with a fixed bed of catalysts comprising vanadium oxides is attached to the bottom of a vertical heat exchange chamber corresponding to that of Fig. 1 having a uniform internal diameter of 4". Through the heat exchange chamber there is moving downwardly by gravity $\frac{5}{8}$" glass balls at the rate of about 1.57 lbs. per hour per lb. of converter effluent which contains about 0.7 mole percent of maleic anhydride. This effluent is introduced at the rate of about 2.5 c.f.m. (free basis) at a temperature of 180° C. The temperature of the glass balls entering the heat exchange chamber is about 26° C. Uncondensed gases are removed from the heat exchange chamber 5 feet above the inlet at a temperature of about 34° C. having a water dew point of about 31° C. This water dew point value is achieved by charging air which has a wet bulb temperature of 40° F. to the converter. The average condenser exit pressure is 6.5 p.s.i.g. Molten maleic anhydride and the glass balls are separately withdrawn from the heat exchange chamber at the bottom thereof.

After 7 hours of continuous operation of the above described process, it was determined that 91% of the maleic anhydride entering the heat exchange chamber had been withdrawn as liquid maleic anhydride. This maleic anhydride contains about 4% by weight of maleic acid. The calculated amount of maleic anhydride which is theoretically recoverable at this condenser exit temperature, assuming 100 percent condenser efficiency, is 93.5%.

EXAMPLES II TO VII

The process as described in Example I is repeated employing a converter effluent having the same maleic anhydride concentration, and employing the same rate of input of the gaseous effluent but varying the moisture content of the converter effluent, varying the rate of flow of the glass balls, varying the inlet temperature of the glass balls and varying the temperature of the gaseous mixture introduced into the heat exchange chamber. All of these variable conditions of operation, together with the results obtained, are shown in Table I below.

*Table I*

SUMMARY OF MOVING PEBBLE BED CONDENSER RESULTS

[Steady state—380 ratio—6.5 lb. condenser exit pressure]

| Example No. | Glass Balls—$\frac{5}{8}$" diam. | | Reactor Effluent Inlet Gas Temp., °C. | Uncondensed Gas | | Percent Condensed | |
|---|---|---|---|---|---|---|---|
| | Wt. Rate Movement, lbs./hour | Inlet Temp., °C. | | Water Dew Point,[1] °C. | Outlet Gas Temp. | Actual | Calculated[2] |
| II | 22 | 29 | 180 | 38 | 38.0 | 95.0 | 90.4 |
| III | 21 | 26 | 180 | 38 | 38.0 | 98.0 | 90.4 |
| IV | 21 | 26 | 220 | 38 | 40.0 | 92.0 | 90.4 |
| V | 22 | 24 | 245 | 38 | 42.0 | 96.0 | 88.7 |
| VI | 24 | 29 | 260 | 38 | 44.0 | 90.0 | 84.0 |
| VII | 15 | 25 | 180 | 44 | 44.0 | 95.0 | 86.0 |

[1] The water dew point of the vapor and mixture was calculated according to known methods, assuming that the water exerted its full vapor pressure.
[2] These figures represent the theoretical amount of maleic anhydride which can be condensed under the particular outlet gas conditions. 100% condenser efficiency is assumed. It is also assumed that the maleic anhydride in said gaseous mixture exerts its full vapor pressure.

The percent maleic acid in the condensate in each of the foregoing examples is below about 15% by weight with the exception of Example VII which ran slightly higher. Analyses of the condenser and pebble rinsings showed no measurable fumaric acid.

EXAMPLE VIII

The process as described in Example I is repeated except that the temperature of the glass balls entering the heat exchange chamber is about 25° C. the water vapor content of the incoming gases is increased so that the uncondensed gases have a dew point of 32° C., and the uncondensed gases are removed at a temperature of about 33° C. In excess of 95% of the maleic anhydride entering the heat exchange chamber is withdrawn as liquid anhydride. This compares with a calculated amount of 94%.

EXAMPLE IX

The process of Example I is repeated except that the temperature of the incoming glass balls entering the heat exchange chamber is about 24° C. and the water vapor content of the condenser inlet gas is increased so that the uncondensed gases have a dew point of 35° C. and the uncondensed gases are removed at a temperature of 35.5° C. In excess of 95% of the maleic anhydride entering the condenser is removed as liquid anhydride. The maleic anhydride contains less than about 5% by weight of maleic acid. The calculated amount of maleic anhydride which is recoverable at this condenser exit temperature is 92%.

EXAMPLE X

The process of Example I is repeated except that the temperature of the incoming glass balls entering the heat exchange chamber is about 35° C., the rate of introduction of the glass balls is 1.86 lbs. per hour per lb. of converter effluent, the condenser inlet gas temperature is 310° C., the water vapor content of the condenser inlet gas is controlled so that the uncondensed gases have a water dew point of 50° C. and the average condenser outlet temperature is 51° C. In excess of 75% of the maleic anhydride entering the condenser is removed. The calculated amount of maleic anhydride which is recoverable at this condenser exit temperature is 72.0%.

From the foregoing, it is apparent that the percent of maleic anhydride which can be condensed from a gaseous mixture lean in maleic anhydride, can be significantly increased by controlling the water vapor content of the gaseous converter effluent which enters the pebble bed condenser, so that the uncondensed gases have a dew point within the range of from about 32° C. to about 50° C. and by also cooling the gases down to temperature which closely approximates the water dew point temperature thereof. When the dew point of the gaseous mixture is controlled at a value in excess of 50° C., i.e., 52° C. and higher, the condenser exit temperature must necessarily correspond to this dew point or a temperature above the water dew point. When a gaseous mixture which has a dew point of 52° C., for example, is cooled to say 52.5° then the acid content of the product is excessively high. If this same gaseous mixture is cooled to only 60° C. then an excessive amount of maleic anhydride goes out with the uncondensed gases. While condenser exit temperatures which are 15° above the water dew point may be used when the gaseous mixture has a low dew point, condenser exit temperatures which are less than 10° C. above the dew point are definitely preferred. When the gaseous mixture has a high dew point, e.g. 45–50° C., the condenser exit temperatures should be at or very near the dew point temperature. It is preferred that the gaseous mixture have a water dew point of from 35° C. to about 45° C., and that said gaseous mixture be cooled to a temperature within the range of from about the dew point to about 5° C. above the dew point of the gaseous mixture. It is even more preferred that the gaseous mixture entering the condenser have a water dew point within the range of 35° C. to 40° C. and that the gaseous mixture be cooled to about the dew point temperature. When operating within this latter range, the percent of maleic anhydride condensed is greater than 90% and the percent maleic acid in the condensate is less than 15%.

It is noted that the inert granular material supplied to the pebble bed condenser has an inlet temperature within the range of from about 25° C. to about the dew point of the gaseous mixture; however, it is preferred that the pebble inlet temperature be substantially, i.e., from about 10 to 15° C. or more, below the water dew point temperature. The inert granular material may also be cooled to temperatures below 25° C.; however, such requires the use of special cooling processes as described above (column 8 supra).

In contrast to the above described methods, i.e., wherein the water dew point of the incoming gases is controlled by adding water to the process air or by humidifying the condenser inlet gases by a metered quantity of steam, when water is added to the condenser by allowing the cooled smooth pebbles of Example I to enter the condenser with a film of water thereon, substantial operating problems are encountered in addition to the fact that the liquid maleic product contains a high percentage (i.e., 40, 50% or more) of acid, in form of maleic and fumaric acid. A typical run is as follows:

The process of Example I is repeated except that substantially dry air, i.e., air which has a wet bulb temperature of approximately 40° F. (0.0043 lbs. H$_2$O vapor per lb. of bone dry air), is charged to the converter. The smooth glass balls ⅝" in diameter are introduced at a temptrature of 25° C. and have a thin film of water thereon. The exit gas temperature averaged 44° C. as the temperature varied during the run since the condenser flooded at various intervals. In excess of 90% of the maleic anhydride is condensed; however, the acid content of the condensate was 40%. This results in the formation of substantial amounts of fumaric acid and tars when such material is refined.

While this invention has been described with respect to certain embodiments, it is not so limited. It is to be understood that variations and modifications thereof which are obvious to those skilled in the art may be made without departing from the spirit or scope of this invention.

This application is a continuation-in-part of U.S. application, Serial Number 473,156 filed December 12, 1954, now abandoned.

What is claimed is:

1. In a process for recovering maleic anhydride from a gaseous mixture lean in maleic anhydride, the steps which comprise feeding a gaseous mixture lean in maleic anhydride which contains sufficient water vapor therein to provide a water dew point of from about 32° C. to about 50° C., to a heat exchange zone, countercurrently contacting said gaseous mixture with a moving mass of sufficently cool non-reactive solid granular heat exchange material to cool said mixture to a temperature within the range of from 15° C. above the water dew point to about the water dew point temperature of said gaseous mixture, maintaining the heat exchange zone at such temperature conditions that said granular heat exchange material becomes heated to a temperaure above the crystallizing temperature of maleic anhydride, and withdrawing the cool uncondensed gases, liquid maleic anhydride and the solid heat exchange materials.

2. In a process for recovering maleic anhydride from a gaseous mixture lean in maleic anhydride, the steps which comprise feeding a gaseous mixture lean in maleic anhydride which contains sufficient water vapor therein to provide a water dew point of from about 32° C. to about 50° C., to a heat exchange zone, countercurrently contacting said gaseous mixture with a moving mass of non-reactive solid granular heat exchange material, the inlet temperature of said material being within the range of from about 25° C. to about the water dew point temperature of the gaseous mixture, under such temperature conditions that the uncondensed gases are cooled to a temperature within the range of from 10° C. above the water dew point to about the water dew point of the gaseous mixture, maintaining the heat exchange zone at such temperature conditions that said granular heat exchange material becomes heated to a temperature above the crystallizing temperature of maleic anhydride, and withdrawing the cool uncondensed gases, liquid maleic anhydride and the solid heat exchange materials.

3. In a process for recovering maleic anhydride from a gaseous mixture lean in maleic anhydride, the steps which comprise feeding a gaseous mixture lean in maleic anhydride which has a water dew point with the range of from about 32° C. to about 50° C., to a heat exchange zone, countercurrently contacting said gaseous mixture with a moving mass of solid granular heat exchange material, the inlet temperature of said material being within the range of from about 10° C., to about 15° C. below the water dew point of said gaseous mixture, under such temperature conditions that the uncondensed gases are cooled to a temperature within the range of from 10° C. above the water dew point to about the water dew point of the gaseous mixture, maintaining the heat exchange zone at such temperature conditions that said granular heat exchange material becomes heated to a temperature above the crystallizing temperature of maleic anhydride, and withdrawing separately the cool uncondensed gases, liquid maleic anhydride and solid granular heat exchange material.

4. In a process for recovering maleic anhydride from a gaseous mixture lean in maleic anhydride the steps which comprise feeding a gaseous mixture lean in maleic anhydride, which has a water dew point within the range of from 35° C. to 45° C., to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature within the range of from 10° C. above the water dew point to about the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

5. In a process for recovering maleic anhydride from a gaseous mixture lean in maleic anhydride, the steps which comprise feeding a gaseous mixture lean in maleic anhydride, which has a water dew point within the range of from 35° C. to 40° C., to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature within the range of from 5° C. above the water dew point to about the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

6. In a process for recovering maleic anhydride from a gaseous mixture lean in maleic anhydride, the steps which comprise feeding a gaseous mixture lean in maleic anhydride, which has a water dew point within the range of from 35° C. to 40° C., to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature which corresponds to the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

7. In a process for recovering maleic anhydride from a gaseous mixture lean in maleic anhydride, the steps which comprise feeding a gaseous mixture lean in maleic anhydride, which has a water dew point within the range of from 35° C. to 40° C., at a temperature of from about 130° C. to about 500° C. to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature within the range of from 10° C. above the water dew point to about the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

8. In a process for recovering maleic anhydride from a gaseous mixture lean in maleic anhydride, the steps which comprise feeding a gaseous mixture lean in maleic anhydride, which has a water dew point within the range of from 35° C. to 40° C., at a temperature of from about 130° C. to about 500° C. to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature within the range of from 5° C. above the water dew point to about the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

9. In a process for recovering maleic anhydride from a gaseous mixture lean in maleic anhydride, the steps which comprise feeding a gaseous mixture lean in maleic anhydride, which has a water dew point within the range of from 35° C. to 40° C., at a temperature of from about 130° C. to about 500° C. to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature which corresponds to the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

10. In a process for recovering maleic anhydride from a gaseous mixture lean in maleic anhydride, the steps which comprise feeding a gaseous mixture lean in maleic anhydride, which has a water dew point within the range of from 35° C. to 40° C., at a temperature of from about 130° C. to about 190° C. to a heat exchange zone, countercurrently contacting said gaseous mixture with a moving mass of solid granular heat exchange material, the inlet temperature of said material being within the range of from about 10° C. to about 15° C. below the water dew point of said gaseous mixture, under such temperature conditions that the uncondensed gases are cooled to a temperature which corresponds to the water dew point of the gaseous mixture, maintaining the heat exchange zone at such temperature conditions that said granular heat exchange material becomes heated to a temperature above the crystallizing temperature of maleic anhydride and withdrawing from the top of said zone the cooled uncondensed gases and from the bottom of said zone withdrawing separately liquid maleic anhydride and the solid granular heat exchange material.

References Cited in the file of this patent

UNITED STATES PATENTS

| | | |
|---|---|---|
| 2,211,160 | Punnett | Aug. 13, 1940 |
| 2,302,888 | Porter | Nov. 24, 1942 |
| 2,702,091 | Smith | Feb. 15, 1955 |